(12) United States Patent
Akhtar et al.

(10) Patent No.: US 9,049,678 B2
(45) Date of Patent: Jun. 2, 2015

(54) INDOOR PERSONAL RELAY

(75) Inventors: Nadeem Akhtar, Chennai (IN); Rajet Krishnan, Chennai (IN); Sheetal Kalyani, Chennai (IN); Sunil Kaimalettu, Chennai (IN); Bhaskar Ramamurthi, Chennai (IN)

(73) Assignee: Centre of Excellence in Wireless Technology, Chennai (IN)

( * ) Notice: Subject to any disclaimer, the term of this patent is extended or adjusted under 35 U.S.C. 154(b) by 369 days.

(21) Appl. No.: 13/699,641

(22) PCT Filed: May 25, 2011

(86) PCT No.: PCT/IN2011/000362
§ 371 (c)(1),
(2), (4) Date: Jan. 11, 2013

(87) PCT Pub. No.: WO2011/148391
PCT Pub. Date: Dec. 1, 2011

(65) Prior Publication Data
US 2013/0225166 A1    Aug. 29, 2013

(30) Foreign Application Priority Data
May 26, 2010    (IN) .............................. 1445/CHE/2010

(51) Int. Cl.
*H04W 60/00*    (2009.01)
*H04W 24/02*    (2009.01)
*H04W 48/16*    (2009.01)
*H04W 84/04*    (2009.01)
*H04B 7/155*    (2006.01)

(52) U.S. Cl.
CPC .............. *H04W 60/00* (2013.01); *H04W 24/02* (2013.01); *H04W 48/16* (2013.01); *H04W 84/045* (2013.01); *H04B 7/155* (2013.01)

(58) Field of Classification Search
CPC ... H04W 84/045; H04W 48/16; H04W 24/10; H04W 72/042; H04W 24/02; H04W 36/0083; H04W 60/00; H04B 7/155; H04B 7/15507
USPC ...................................... 455/435.1, 444, 448
See application file for complete search history.

(56) References Cited

U.S. PATENT DOCUMENTS

| | | | |
|---|---|---|---|
| 2009/0264077 A1* | 10/2009 | Damnjanovic | ............... 455/63.1 |
| 2010/0135235 A1* | 6/2010 | Ji et al. | .......................... 370/329 |
| 2010/0220621 A1* | 9/2010 | Li et al. | .......................... 370/252 |
| 2010/0238826 A1* | 9/2010 | Borran et al. | .................. 370/252 |
| 2012/0028645 A1* | 2/2012 | Kim et al. | ...................... 455/444 |

* cited by examiner

*Primary Examiner* — Ajit Patel
(74) *Attorney, Agent, or Firm* — Rahman LLC

(57) ABSTRACT

The embodiments herein disclose an indoor personal relay which has a wireless interface with the BS, which is effective in both cost and technology terms. The indoor personal relay, as disclosed herein is an estimate and forward relay. The relay 101 as disclosed herein does not perform any additional channel decoding/encoding on the data that it receives from the UE or BS. Embodiments disclosed herein enable the relevant UEs to have a high SINR link with the relay. This, in turn, translates to a better effective link quality between the UE and BS and higher indoor rates, which otherwise may have been not as good as a consequence of poor direct link between the UE and the BS. This relay is effectively transparent to the UE. The deployment of relays also implies minimal impact on UE IOT.

17 Claims, 14 Drawing Sheets

| | T | 2T | 3T | 4T |
|---|---|---|---|---|
| BS Tx | f1+f2 | | f1+f2 | |
| | | | | |
| Relay Rx | | | | |
| | | | | |
| RN Tx | | f1+f2 | | f1+f2 |
| | | | | |
| UE Rx | | | | |

(b)

| | T | 2T | 3T | 4T |
|---|---|---|---|---|
| BS Tx | f1+f2 | | f3+f4 | |
| | | | | |
| Relay Rx | | | | |
| | | | | |
| RN Tx | | f1+f3 | | f1+f2 |
| | | | | |
| UE Rx | | | | |

(c)

| | T | 2T | 3T | 4T | 5T |
|---|---|---|---|---|---|
| BS Tx | f1+f2 | | f3+f4 | | |
| | | | | | |
| Relay Rx | | | | | |
| | | | | | |
| RN Tx | | f1+f2 | | | f1+f2 |
| | | | | | |
| UE Rx | | | | | |

INDOOR PERSONAL RELAY

The present application is based on, and claims priority from, an Indian Application Number, 1445/CHE/2010 filed on 26 May 2010, the disclosure of which is hereby incorporated by reference herein.

TECHNICAL FIELD

This application relates to wireless communication networks, and more particularly to capacity expansion in wireless communication networks.

BACKGROUND

From a cellular packet network perspective, significant efforts have been invested to solve issues primarily related to coverage extension and capacity expansion. To serve the purpose of coverage extension, advanced wireless networks have been equipped with L3 relays (where data forwarding involves layer 3) with intelligence and processing complexity equivalent to base stations. These entities support legacy user devices and appear as base stations.

In order to resolve issues related to capacity expansion, the use of femto/pico/micro cells has also been proposed that essentially interfaces with the core network through dedicated backhaul like wired (DSL or optical), wireless (microwave link) while maintaining the same wireless access interface with the UE as a BS.

However, the proposed femto/pico/micro cells have a back-end system to co-ordinate between the femto/pico/micro cells and the communication network, which may be a wired communication network. Though this proposition is attractive in the context of rich wired infrastructure that exists in more developed countries, it may neither be feasible nor cost-effective to deploy these entities in their conventional form in less developed countries like India. This is because the existing density of wired connection is as low as 10 per 1000 person and last mile problems are still persistent.

SUMMARY

In view of the foregoing, an embodiment herein provides a method to enable a relay to associate with a Base Station (BS) in a wireless communication network, the method comprising of the relay searching for a best BS; the relay attaching to the best BS; the relay sending list of Closed Subscriber Group (CSG) UEs to the BS; the BS checking if at least one of the CSG UEs is attached to the BS; and the relay completing association procedure with the BS if at least one CSG UE is attached to the BS. The method further comprises of the relay checking if a pre-specified number of failed association attempts have been reached, if the best BS did not have at least one CSG UE attached to it or the relay cannot associate with the best BS; and the relay attempting to associate with next best BS, if the pre-specified number of failed association attempts have not been reached. The method further comprises of the relay powering down for a pre-specified time period after the pre-specified number of failed association attempts has been reached. The method further comprises of the relay associating with the best BS if no BS with at least one the CSG UE is found when the pre-specified number of association attempts have been reached; the relay entering into idle mode; and the relay entering into active mode, on receiving a message from the BS that at least one CSG UE is detected in vicinity of the relay. The method further comprises of the relay associating with a plurality of BSs if no BS with at least one the CSG UE is found when the pre-specified number of association attempts have been reached; the relay entering into idle mode; and the relay associating with one BS from the plurality of BSs, on receiving a message from the one BS that at least one CSG UE is detected in vicinity of the relay. The BS may assign a unique identifier to the relay, on the relay completing association procedure with the BS. The relay may register capabilities of the relay with the BS, on the relay completing association procedure with the BS. The relay may be assigned with a network identifier, on the relay completing association procedure with the BS. The BS may send a control message to the relay instructing the relay to power down when the relay has not served any UEs for a specified period of time. The BS may send a control message to the relay instructing the relay to power down when the relay is causing excessive interference. The relay may power down when the relay detects that mobility level of the relay has crossed a predefined threshold.

Also, disclosed herein is a method for enabling a User Equipment (UE) attached to a BS in a communication network to communicate with the BS via a relay associated with the BS, the method comprising of the Base Station (BS) checking if the UE is authorized to associate with the relay, on detecting the UE in coverage area of the relay, wherein the UE is associated with the BS; and the BS instructing the UE to perform measurements on the relay; the BS instructing the relay to transmit a signal comprising of unique identifier of the relay and relevant system information; the UE making measurements on basis of the signal received from the relay; the UE reporting the measurements to the BS; the BS deciding if the relay meets criteria required to serve the UE, based on the measurements received from the UE; and the BS associating the UE with the relay, if the relay meets criteria required to serve the UE. The method further comprises of the BS informing the relay about the UE, on the BS deciding that the UE can be served by the relay; and the BS sharing UE-related information with the relay. The method further comprises of the relay sending information received from the BS to the UE, where the information is at least one of data or control signals and where destination of the received information is the UE; and the relay sending information received from the UE to the BS, where the information is at least one of data or control signals and where destination of the received information is the BS. The method further comprises of the relay converting the received information into baseband; the relay performing channel estimation on the received information; the relay equalizing the information using the channel estimation; the relay making hard decisions on the equalized information; the relay constructing frame using the at least one of the equalized information or the hard decisions; the relay generating pilots and inserting the pilots in the frame; and the relay transmitting the frame. The relay making the hard decisions comprises of the relay demodulating the equalized information; the relay descrambling the demodulated information; the relay rescrambling the de-scrambled information using a scrambling sequence, wherein the BS informs the relay of the scrambling sequence; and the relay modulating the scrambled information. Alternatively, to avoid the de-scrambling and rescrambling steps at the relay, the BS may select a scrambling sequence for scrambling the data before transmission of the data to the relay corresponding to time instant when the relay forwards data to the UE. The generated pilots may be based on instructions from the BS. The criteria required for a UE to be associated with the relay comprises at least one of radio link between the relay and the UE meeting a threshold quality level; number of UEs attached to the relay not exceeding a threshold value; and link between the BS and the relay not being overloaded. The criteria required for the UE to be associated with the relay UE comprises of the UE being present in CSG of the relay. The BS may control schedule of transmissions from the relay to the UE. The BS indicates resources that may be used for transmissions from the relay to the UE; indicates resources that may not be used for transmissions from the relay to the UE; and indicates a set of resources, from which the relay may pick resources for transmissions from the relay to the UE. The BS may send the indications periodically or aperiodically. The method further comprises of the BS sending UE-specific information to the relay needed to decode control information for the UE when the UE is associated with the relay; and the relay decoding control information sent by the BS to the UE, wherein the control information comprises of downlink resource allocation and uplink grant for the UE. The BS may control power of transmissions between the relay and the UE. The process of BS controlling power of transmissions from the UE to the relay comprises of the relay measuring transmit power of the UE; the relay reporting received power from the UE to the BS; the BS determining power to be used on link between the UE and the relay; and the BS signalling power level to the UE. The relay measures transmit power of the UE using sounding channel. The transmit power specified by the BS for the relay may be a range of power levels and the relay varies transmit power level within the range. The BS may send control signals directly to the UE.

Disclosed herein is a method to enable a User Equipment (UE) to attach with a BS in presence of relays, when the UE becomes active from idle mode or powers on, the method comprising of the UE measuring received signal strengths from a plurality of BSs; the UE measuring received signal strengths from at least one relay, when the at least one relay has been instructed by their serving BS to transmit unique identifier of the relay, cell barring message and other system information; the UE checking for cell barring message in the transmission; the UE does not attach with relays, on detecting cell-barring message in transmission from the relays; and the UE attaching with one of the BS.

Disclosed herein is a method to enable a User Equipment (UE) to attach with serving BS of a relay, when the UE becomes active from idle mode or powers on, the method comprising of the UE measuring received signal strengths from a plurality of BSs; the UE measuring received signal strengths from at least one relay, when the at least one relay has been instructed by their serving BS to transmit unique identifier of the relay, list of blacklisted BSs, cell barring message and other system information, where the list of blacklisted BSs includes all BSs except BS serving the relay; the UE not attempting to attach with any BSs present in the list of blacklisted BSs or the relay; and the UE attempting to attach with BS serving the relay.

Disclosed herein is a method to enable a User Equipment (UE) attached with a BS to associate with a relay, the method comprising of the UE making measurements of signal strength of at least one relay and neighbouring BSs; the UE sending a report to BS to which the UE is attached, wherein the report comprises of the measurements of at least one relay that can serve the UE; the BS finding best relay that can be used to serve the UE based on the report; the BS associating the UE with the best relay, if the best relay is attached to the BS; the BS instructing the UE to handover to a neighbouring BS, if the best relay is associated with the neighbouring BS; and the BS deciding to continue serving the UE directly if the best relay is not found. The criteria for BS to find the best relay for a UE comprises at least one of proximity of the UE to the relay; signal strength of link between the UE and the relay; signal strength of link between the relay and serving BS of the relay; number of UEs already associated with the relay; if the relay is CSG and the UE is in CSG list of the relay; and if Quality of Service parameters of the UE can be met while serving the UE through the relay.

Disclosed herein is a method to enable a relay to associate with a Base Station (BS) in a wireless communication network, the method comprising of the relay searching for best BS; the relay attaching to the BS; the relay sending list of Closed Subscriber Group (CSG) UEs of the relay to the best BS; the best BS checks with neighbouring BS if at least one of the CSG UEs are attached with the neighbhouring BS, if the best BS finds that none of the CSG UEs are attached to the best BS; and the best BS instructing the relay to handover to a neighbouring BS, if one neighbouring BS confirms presence of at least one CSG UE attached to the neighbouring BS and if other association criteria are satisfied. The BS may assign a unique identifier to the relay, on the relay completing association procedure with the BS. The relay may register capabilities of the relay with the BS, on the relay completing association procedure with the BS. The relay may be assigned with a network identifier, on the relay completing association procedure with the BS. The BS may send a control message to the relay instructing the relay to power down when the relay has not served any UEs for a specified period of time. The BS may send a control message to the relay instructing the relay to power down when the relay is causing excessive interference. The relay may power down when the relay detects that mobility level of the relay has crossed a predefined threshold. The association criteria comprises at least one of proximity of the CSG UE to the relay; signal strength of link between the UE and the relay; quality of link between the relay and the neighbouring BS; number of UEs associated with the relay; and if Quality of Service parameters of the UE can be met while serving it through the relay.

Disclosed herein is a method for a BS to trigger a relay to transmit identifier and other system information, the method comprising of the BS detecting a UE that is authorized to connect to the relay in vicinity of the relay; and the BS instructing the relay to broadcast the unique identifier and system information.

Disclosed herein is a method for a BS to trigger a relay to transmit unique identifier and other system information, the method comprising of the BS receiving a request for a scanning interval from a UE; the BS sending a measurement list to the UE which includes the relay; and the BS instructing the relay to broadcast the unique identifier and system information.

Disclosed herein is a method for a BS to trigger a relay to transmit unique identifier and other system information, the method comprising of the BS instructing an attached UE to measure signal strength of a list of BS and relays which includes the relay; and the BS instructing the relay to broadcast the unique identifier and system information.

Disclosed herein is a method for a BS to trigger a relay to transmit unique identifier and other system information, the method comprising of the BS receiving a request from a neighbouring BS; and the BS instructing the relay to broadcast the unique identifier and system information.

Disclosed herein is a wireless communication network, the network comprising of at least one User Equipment (UE), at least one relay and at least one Base Station (BS), the network configured to enable the relay to search for a best BS; the relay to attach to the best BS; the relay to send list of Closed Subscriber Group (CSG) UEs to the BS; the BS to check if at least one of the CSG UEs is attached to the BS; and the relay to complete association procedure with the BS if at least one CSG UE is attached to the BS. The network is further configured to enable the relay to check if a pre-specified number of failed association attempts have been reached, if the best BS did not have at least one CSG UE attached to it or the relay cannot associate with the best BS; and the relay to attempt to associate with next best BS, if the pre-specified number of failed association attempts have not been reached. The network is further configured to enable the relay to power down for a pre-specified time period after the pre-specified number of failed association attempts has been reached. The network is further configured to enable the relay to associate with the best BS if no BS with at least one the CSG UE is found when the pre-specified number of association attempts have been reached; the relay to enter into idle mode; and the relay entering into active mode, on receiving a message from the BS that at least one CSG UE is detected in vicinity of the relay. The network is further configured to enable the relay to associate with a plurality of BSs if no BS with at least one the CSG UE is found when the pre-specified number of association attempts have been reached; the relay to enter into idle mode; and the relay to associate with one BS from the plurality of BSs, on receiving a message from the one BS that at least one CSG UE is detected in vicinity of the relay. The network is further configured to enable the BS to assign a unique identifier to the relay, on the relay completing association procedure with the BS. The network is further configured to enable the relay to register capabilities of the relay with the BS, on the relay completing association procedure with the BS. The network is further configured to enable the BS to assign a network identifier to the relay, on the relay completing association procedure with the BS. The network is further configured to enable the BS to send a control message to the relay instructing the relay to power down when the relay has not served any UEs for a specified period of time. The network is further configured to enable the BS to send a control message to the relay instructing the relay to power down when the relay is causing excessive interference. The network is further configured to enable the relay to power down when the relay detects that mobility level of the relay has crossed a predefined threshold.

Disclosed herein is a wireless communication network comprising of at least one User Equipment (UE), at least one relay and at least one Base Station (BS), where the User Equipment (UE) is attached to the BS and communicates with the BS via the relay associated with the BS, the network configured to enable the BS to check if the UE is authorized to associate with the relay, on detecting the UE in coverage area of the relay, wherein the UE is associated with the BS; and the BS to instruct the UE to perform measurements on the relay; the BS to instruct the relay to transmit a signal comprising of unique identifier of the relay and relevant system information; the UE to make measurements on basis of the signal received from the relay; the UE to report the measurements to the BS; the BS to decide if the relay meets criteria required to serve the UE, based on the measurements received from the UE; and the BS to associate the UE with the relay, if the relay meets criteria required to serve the UE. The network is further configured to enable the BS to inform the relay about the UE, on the BS deciding that the UE can be served by the relay; and the BS to share UE-related information with the relay. The network is further configured to enable the relay to send information received from the BS to the UE, where the information is at least one of data or control signals and where destination of the received information is the UE; and the relay to send information received from the UE to the BS, where the information is at least one of data or control signals and where destination of the received information is the BS. The network is further configured to enable the relay to convert the received information into baseband; the relay to perform channel estimation on the received information; the relay to equalize the information using the channel estimation; the relay to make hard decisions on the equalized information; the relay to construct frame using the at least one of the equalized information or the hard decisions; the relay to generate pilots and inserting the pilots in the frame; and the relay to transmit the frame. The network is further configured to enable the relay to make the hard decisions by configuring the relay to demodulate the equalized information; the relay to descramble the demodulated information; the relay to rescramble the de-scrambled information using a scrambling sequence, wherein the BS informs the relay of the scrambling sequence; and the relay to modulate the scrambled information. The network is further configured to enable BS to select the scrambling sequence before transmission of the data to the relay corresponding to time instant when the relay forwards data to the UE. The network is further configured to enable the relay to generate the generated pilots based on instructions from the BS. The network is further configured to consider criteria required for the relay to serve the UE comprising at least one of radio link between the relay and the UE meeting a threshold quality level; number of UEs attached to the relay not exceeding a threshold value; and link between the BS and the relay not being overloaded. The network is further configured to consider criteria required for the relay to serve the UE comprising at least one of the UE being present in CSG of the relay. The network is further configured to enable the BS to control schedule of transmissions from the relay to the UE. The network is further configured to enable the BS to indicate resources that may be used for transmissions from the relay to the UE; indicate resources that may not be used for transmissions from the relay to the UE; and indicate a set of resources, from which the relay may pick resources for transmissions from the relay to the UE. The network is further configured to enable the BS to send the indications periodically or aperiodically. The network is further configured to enable the BS to send UE-specific information to the relay needed to decode control information for the UE when the UE is associated with the relay; and the relay to decode control information sent by the BS to the UE, wherein the control information comprises of downlink resource allocation and uplink grant for the UE. The network is further configured to enable the BS to control power of transmissions between the relay and the UE. The network is further configured to enable the BS to control power of transmissions from the UE to the relay by enabling the relay to measure transmit power of the UE; the relay to report received power from the UE to the BS; the BS to determine power to be used on link between the UE and the relay; and the BS to signal power level to the UE. The network is further configured to enable the relay to measure transmit power of the UE using sounding channel. The network is further configured to enable the relay to vary transmit power level within a range of power levels set by the BS, wherein the power level is the range of power levels. The network is further configured to enable the BS to send control signals directly to the UE.

Disclosed herein is a wireless communication network comprising of at least one User Equipment (UE), at least one relay and at least one Base Station (BS), the network enabling the User Equipment (UE) to attach with a BS in presence of relays, when the UE becomes active from idle mode or powers on by configuring the network to enable the UE to measure received signal strengths from a plurality of BSs; the UE to measure received signal strengths from at least one relay, when the at least one relay has been instructed by their serving BS to transmit unique identifier of the relay, cell barring message and other system information; the UE to check for cell barring message in the transmission; the UE to not attach with relays, on detecting cell-barring message in transmission from the relays; and the UE to attach with one of the BS.

Disclosed herein is a wireless communication network comprising of at least one User Equipment (UE), at least one relay and at least one Base Station (BS), the network enabling the User Equipment (UE) to attach with serving BS of a relay, when the UE becomes active from idle mode or powers on by configuring the network to enable the UE to measure received signal strengths from a plurality of BSs; the UE to measure received signal strengths from at least one relay, when the at least one relay has been instructed by their serving BS to transmit unique identifier of the relay, list of blacklisted BSs, cell barring message and other system information, where the list of blacklisted BSs includes all BSs except BS serving the relay; the UE to not attempt to attach with any BSs present in the list of blacklisted BSs or the relay; and the UE to attempt to attach with BS serving the relay.

Disclosed herein is a wireless communication network comprising of at least one User Equipment (UE), at least one relay and at least one Base Station (BS), the network enabling the User Equipment (UE) attached with a BS to associate with a relay by configuring the network to enable the UE to measure signal strength of at least one relay and neighbouring BSs; the UE to send a report to BS to which the UE is attached, wherein the report comprises of the measurements of at least one relay that can serve the UE; the BS to find best relay that can be used to serve the UE based on the report; the BS to associate the UE with the best relay, if the best relay is attached to the BS; the BS to instruct the UE to handover to a neighbouring BS, if the best relay is associated with the neighbouring BS; and the BS to continue serving the UE directly, if the best relay is not found. The network is further configured to consider criteria required for the BS to find the best relay comprises at least one of proximity of the UE to the relay; signal strength of link between the UE and the relay; signal strength of link between the relay and serving BS of the relay; number of UEs already associated with the relay; if the relay is CSG and the UE is in CSG list of the relay, if the relay has a CSG list; and if Quality of Service parameters of the UE can be met while serving the UE through the relay.

Disclosed herein is a wireless communication network comprising of at least one User Equipment (UE), at least one relay and at least one Base Station (BS), the network enabling a relay to associate with a Base Station (BS) by configuring the network to enable the relay searching for best BS; the relay attaching to the BS; the relay sending list of Closed Subscriber Group (CSG) UEs of the relay to the best BS; the best BS checks with neighbouring BS if at least one of the CSG UEs are attached with the neighbouring BS, if the best BS finds that none of the CSG UEs are attached to the best BS; and the best BS instructing the relay to handover to a neighbouring BS, if one neighbouring BS confirms presence of at least one CSG UE attached to the neighbouring BS and if other association criteria are satisfied. The network is configured to enable the BS to assign a unique identifier to the relay, on the relay completing association procedure with the BS. The network is configured to enable the relay to register capabilities of the relay with the BS, on the relay completing association procedure with the BS. The network is further configured to enable the BS to assign a network identifier to the relay, on the relay completing association procedure with the BS. The network is configured to enable the BS to send a control message to the relay instructing the relay to power down when the relay has not served any UEs for a specified period of time. The network is configured to enable the BS to send a control message to the relay instructing the relay to power down when the relay is causing excessive interference. The network is configured to enable the relay to power down when the relay detects that mobility level of the relay has crossed a predefined threshold. The network is further configured to consider the association criteria comprising at least one of proximity of the CSG UE to the relay; signal strength of link between the UE and the relay; quality of link between the relay and the neighbouring BS; number of UEs associated with the relay; and if Quality of Service parameters of the UE can be met while serving it through the relay.

Disclosed herein is a wireless communication network comprising of at least one User Equipment (UE), at least one relay and at least one Base Station (BS), the network configured to enable the BS to trigger the relay to transmit identifier and other system information by enabling the BS to detect a UE that is authorized to connect to the relay in vicinity of the relay; and the BS to instruct the relay to broadcast the unique identifier and system information.

Disclosed herein is a wireless communication network comprising of at least one User Equipment (UE), at least one relay and at least one Base Station (BS), the network configured to enable the BS to trigger the relay to transmit unique identifier and other system information by enabling the BS to receive a request for a scanning interval from a UE; the BS to send a measurement list to the UE which includes the relay; and the BS to instruct the relay to broadcast the unique identifier and system information.

Disclosed herein is a wireless communication network comprising of at least one User Equipment (UE), at least one relay and at least one Base Station (BS), the network configured to enable the BS to trigger the relay to transmit unique identifier and other system information by enabling the BS to instruct an attached UE to measure signal strength of a list of BS and relays which includes the relay; and the BS to instruct the relay to broadcast the unique identifier and system information.

Disclosed herein is a wireless communication network comprising of at least one User Equipment (UE), at least one relay and at least one Base Station (BS), the network configured to enable the BS to trigger the relay to transmit unique identifier and other system information by enabling the BS to receive a request from a neighbouring BS; and the BS to instruct the relay to broadcast the unique identifier and system information.

Disclosed herein is a relay in a wireless communication network, the relay comprising at least one means configured to search for a best BS; attach to the best BS; send list of Closed Subscriber Group (CSG) UEs to the BS; check if at least one of the CSG UEs is attached to the BS; and complete association procedure with the BS if at least one CSG UE is attached to the BS. The relay is further configured to check if a pre-specified number of failed association attempts have been reached, if the best BS did not have at least one CSG UE attached to it or the relay cannot associate with the best BS; and attempt to associate with next best BS, if the pre-specified number of failed association attempts has not been reached. The relay is further configured to power down for a pre-specified time period after the pre-specified number of failed association attempts has been reached. The relay is further configured to associate with the best BS if no BS with at least one the CSG UE is found when the pre-specified number of association attempts have been reached; enter into idle mode; and enter into active mode, on receiving a message from the BS that at least one CSG UE is detected in vicinity of the relay. The relay is further configured to associate with a plurality of BSs if no BS with at least one the CSG UE is found when the pre-specified number of association attempts have been reached; enter into idle mode; and associate with one BS from the plurality of BSs, on receiving a message from the one BS that at least one CSG UE is detected in vicinity of the relay. The relay is further configured to register capabilities of the relay with the BS, on the relay completing association procedure with the BS. The relay is further configured to power down when the relay detects that mobility level of the relay has crossed a predefined threshold. The relay is further configured to send information received from the BS to the UE, where the information is at least one of data or control signals and where destination of the received information is the UE; and send information received from the UE to the BS, where the information is at least one of data or control signals and where destination of the received information is the BS. The relay is further configured to convert the received information into baseband; perform channel estimation on the received information; equalize the information using the channel estimation; make hard decisions on the equalized information; construct frame using the at least one of the equalized information or the hard decisions; generate pilots and inserting the pilots in the frame; and transmit the frame. The relay is further configured to making the hard decisions by demodulating the equalized information; descrambling the demodulated information; rescrambling the de-scrambled information using a scrambling sequence, wherein the BS informs the relay of the scrambling sequence; and modulating the scrambled information. The relay is further configured to generate the generated pilots based on instructions from the BS. The relay is configured to decode control information sent by the BS to the UE, wherein the control information comprises of downlink resource allocation and uplink grant for the UE. The relay is further configured to measure transmit power of the UE, on receiving an indication from the BS; report transmit power from the UE to the BS; and change signal power of transmission based on an indication received from the BS. The relay is configured to measure transmit power of the UE using sounding channel. The relay is configured to vary transmit power level within a range of power levels set by the BS, wherein the power level is the range of power levels. The relay comprises at least one antenna.

Disclosed herein is a relay in a wireless communication network, the relay comprising at least one means configured to search for a best BS; attach to the best BS; send list of Closed Subscriber Group (CSG) UEs of the relay to the best BS; hand over to a neighbouring BS, on receiving an indication from the best BS, further wherein the best BS sending the indication on the neighbouring BS confirming presence of at least one CSG UE attached to the neighbouring BS and if other association criteria are satisfied. The relay is configured to register capabilities of the relay with the neighbouring BS, on the relay completing association procedure with the neighbouring BS. The relay comprises at least one antenna.

Disclosed herein is a relay in a wireless communication network, the relay comprising at least one means configured to broadcast identifier and system information on receiving an indication from a BS, where the relay is attached to the BS. The relay comprises at least one antenna.

Disclosed herein is a Base Station (BS) in a wireless communication network, the BS comprising at least one means configured to check if at least one Closed Subscriber Group (CSG) UEs from a list of CSG UEs is attached to the BS, on a relay attaching to the BS and receiving a list of CSG UEs from the relay; send an indication to the relay, if at least one CSG UE is attached to the BS; and enable the relay to complete association procedure with the BS. The BS is further configured to check if a UE is present in the list of CSG UEs, on the UE attaching to the BS and the relay is attached to the BS and the relay is in idle mode; and send a message to the relay, if the UE is present in the list of CSG UEs. The BS is configured to assign a unique identifier to the relay, on the relay completing association procedure with the BS. The BS is configured to assign a network identifier to the relay, on the relay completing association procedure with the BS. The BS is configured to send a control message to the relay instructing the relay to power down when the relay has not served any UEs for a specified period of time. The BS is configured to send a control message to the relay instructing the relay to power down when the relay is causing excessive interference.

Disclosed herein is a Base Station (BS) in a wireless communication network, the BS comprising at least one means configured to check if a UE is authorized to associate with a relay, on detecting the UE in coverage area of the relay, wherein the UE is associated with the BS; and instruct the UE to perform measurements on the relay; instruct the relay to transmit a signal comprising of unique identifier of the relay and relevant system information; decide if the relay meets criteria required to serve the UE, based on the measurements received from the UE; and associate the UE with the relay, if the relay meets criteria required to serve the UE. The BS is configured to inform the relay about the UE, on the BS deciding that the UE can be served by the relay; and share UE-related information with the relay. The BS is configured to select the scrambling sequence before transmission of the data to the relay corresponding to time instant when the relay forwards data to the UE. The BS is configured to send instructions regarding pilots to the relay. The BS is further configured to consider criteria required for the relay to serve the UE comprising at least one of radio link between the relay and the UE meeting a threshold quality level; number of UEs attached to the relay not exceeding a threshold value; and link between the BS and the relay not being overloaded. The BS is configured to consider criteria required for the relay to serve the UE comprising at least one of the UE being present in CSG of the relay. The BS is configured to control schedule of transmissions from the relay to the UE. The BS is configured to indicate resources that may be used for transmissions from the relay to the UE; indicate resources that may not be used for transmissions from the relay to the UE; and indicate a set of resources, from which the relay may pick resources for transmissions from the relay to the UE. The BS is configured to send the indications periodically or aperiodically. The BS is configured to send UE-specific information to the relay needed to decode control information for the UE when the UE is associated with the relay. The BS is configured to control power of transmissions between the relay and the UE by determining power to be used on link between the UE and the relay, based on reports from the relay comprising measurements of received power from the UE; and signalling power level to the UE. The BS is configured to send the power level as a range of power levels. The BS is configured to send control signals directly to the UE.

Disclosed herein is a Base Station (BS) in a wireless communication network, the BS comprising at least one means configured to find best relay that can be used to serve a UE based on a report, on receiving a report from the UE (wherein the UE is attached to the BS), wherein the report send by the UE comprises of measured signal strength of at least one relay and neighbouring BSs; associate the UE with the best relay, if the best relay is attached to the BS; and instruct the UE to handover to a neighbouring BS, if the best relay is associated with the neighbouring BS. The criteria considered by the BS to find the best relay comprises at least one of proximity of the UE to the relay; signal strength of link between the UE and the relay; signal strength of link between the relay and serving BS of the relay; number of UEs already associated with the relay; if the relay is CSG and the UE is in CSG list of the relay, if the relay has a CSG list; and if Quality of Service parameters of the UE can be met while serving the UE through the relay.

Disclosed herein is a Base Station (BS) in a wireless communication network, the BS comprising at least one means configured to check with neighbouring BS if any CSG UEs from a list of Closed Subscriber Group (CSG) UEs from a relay are attached with the BS, if the BS finds that none of the CSG UEs are attached to the BS, on receiving a list of CSG UEs from the relay; and instruct the relay to handover to a neighbouring BS, if one neighbouring BS confirms presence of at least one CSG UE attached to the neighbouring BS and if other association criteria are satisfied. The BS is configured to assign a unique identifier to the relay, on the relay completing association procedure with the BS. The BS is configured to assign a network identifier to the relay, on the relay completing association procedure with the BS. The BS is configured to send a control message to the relay instructing the relay to power down when the relay has not served any UEs for a specified period of time. The BS is configured to send a control message to the relay instructing the relay to power down when the relay is causing excessive interference. The BS is configured to consider the association criteria comprising at least one of proximity of the CSG UE to the relay; signal strength of link between the UE and the relay; quality of link between the relay and the neighbouring BS; number of UEs associated with the relay; and if Quality of Service parameters of the UE can be met while serving the UE through the relay.

Disclosed herein is a Base Station (BS) in a wireless communication network, the BS comprising at least one means configured to detect a UE that is authorized to connect to the relay in vicinity of the relay; and instruct the relay to broadcast unique identifier of the relay and system information.

Disclosed herein is a Base Station (BS) in a wireless communication network, the BS comprising at least one means configured to receive a request for a scanning interval from a UE; send a measurement list to the UE which includes the relay; and instruct the relay to broadcast unique identifier of the relay and system information.

Disclosed herein is a Base Station (BS) in a wireless communication network, the BS comprising at least one means configured to instruct an attached UE to measure signal strength of a list of BS and relays which includes the relay; and instruct the relay to broadcast unique identifier of the relay and system information.

Disclosed herein is a Base Station (BS) in a wireless communication network, the BS comprising at least one means configured to receive a request from a neighbouring BS; and instruct the relay to broadcast unique identifier of the relay and system information.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which:

FIG. 10 depicts allocation of resources, according to embodiments as disclosed herein;

DETAILED DESCRIPTION OF EMBODIMENTS

Figure 1:
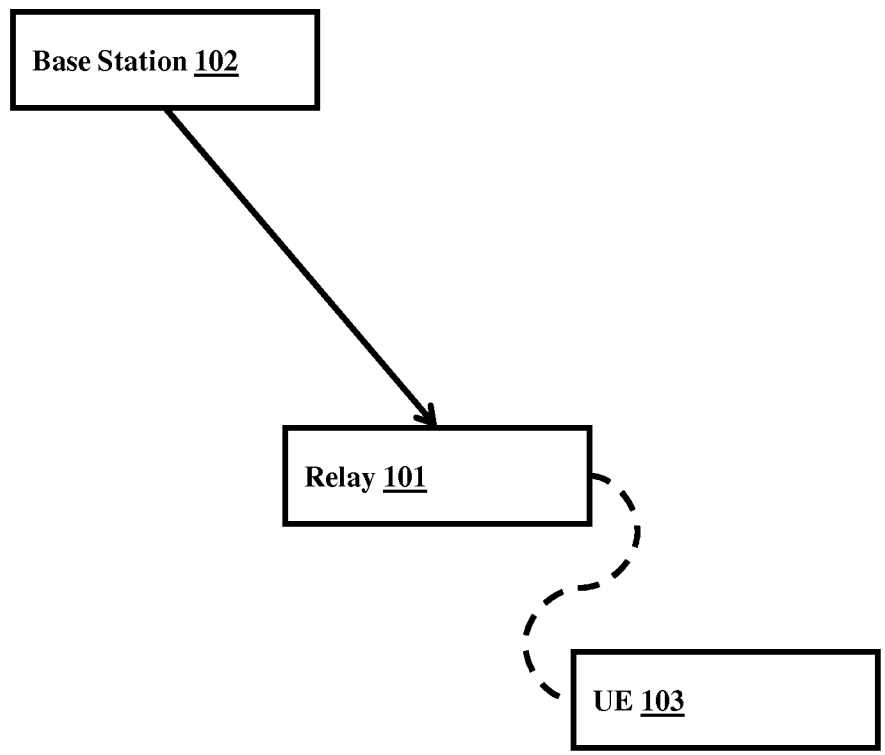
FIG. 1 depicts a wireless communication network, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose an indoor personal relay which has a wireless interface with the Base Stations (BS), which is effective in both cost and technology terms. Referring now to the drawings, and more particularly to FIGS. 1 through 14, where similar reference characters denote corresponding features consistently throughout the figures, there are shown embodiments.

Embodiments disclosed herein relates to a relay used in conjunction with BS for improving the coverage and throughput to indoor users, wherein the relay can be attached to at least one BS and used by the BS to forward data and signaling to/from User Equipments (UEs) which are connected to the BS.

FIG. 1 depicts a wireless communication network, according to embodiments as disclosed herein. The network as depicted comprises of at least one BS 102, a relay 101 and at least one UE 103. The BS 102 may be one of a cellular BS, a pico BS, a macro BS, a femto BS, L3 relay or any other device capable of performing similar functions. The relay 101 is an estimate-and-forward relay as defined in literature. The relay 101 will have antennas to form a high SINR link with a BS, where the antennas may be directional, appropriately beam-formed antennas, an antenna array or any other suitable antenna. Based on the received signal strength from the BS 102, the relay 101 can be installed at an appropriate location in the vicinity of the targeted UE 103. The relay 101 on powering up associates with a suitable BS 102. In another embodiment herein, the relay 101 may also associate with more than one BS 102 at a time. The UE 103 must be authorized to associate with the relay 101. The relay 101 forwards the signals which may comprise of data and control information from the BS 102 to the UE 103 and from the UE 103 to the BS 102.

UE 103 is associated with relay 101 in the sense that relay 101 can only be used to forward data and control between UE 103 and BS 102 without UE 103 undergoing any network attachment procedure with the relay 101. Relay 101 is considered to be associated with BS 102 when it has completed the attachment and capability registration procedures and has been assigned the unique identifier and network identifier. Relay 101 can also perform simple attachment like a UE. In the attached state, it can share the list of CSG UEs with the BS.

Figure 2:
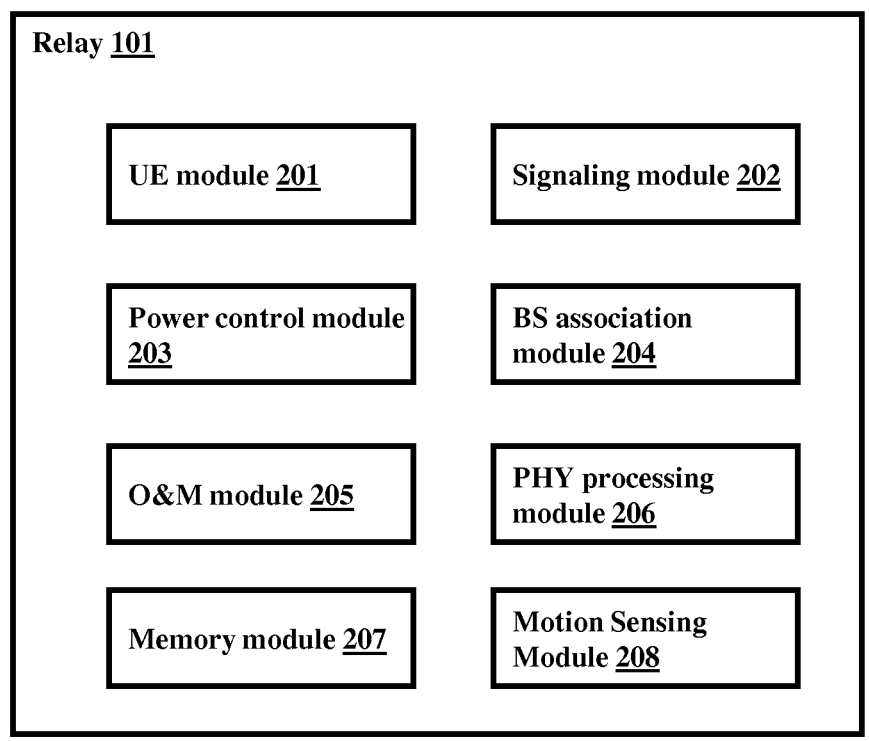
FIG. 2 depicts a relay, according to embodiments as disclosed herein.

FIG. 2 depicts a relay, according to embodiments as disclosed herein. The relay 101 comprises of a UE functionality module 201, a signaling module 202, a power control module 203, an O&M module 204, a BS association module 205, a PHY processing module 206, a memory module 207 and a motion sensing module 208.

The signaling module 202 is in charge of creating messages destined for the BS 102 and transferring the messages to the BS 102 using appropriate means. The signaling module 202 is also in charge of receiving messages sent from the BS 102 and processing the messages. The signaling module 202 may further instruct other modules in the relay 101 to perform appropriate actions, as per the received messages.

The power control module 203 measures the power from the UE 103. The measurement of the power from the UE 103 is done using an appropriate means such as sounding signals or any other relevant transmission received from the UE 103. The power control module 203 can also vary the relay transmit power, either autonomously or under instructions from the BS 102.

The O&M module 204 receives operational information from the BS 102 and makes the necessary configurations and settings. The operational information may comprise of messages such as provisioning messages.

The BS association module 205 selects the BS 102 to which the relay must attach/associate. The BS association module 205 may select the BS 102 with the strongest signal. The BS association module 205 may also select the BS 102 which has more users present in the CSG of the relay. The BS association module 205 may also select a plurality of BS 102 to attach with.

The PHY processing module 206 receives the signals to be forwarded by the relay 101 from the UE 103 to BS 102 or the BS 102 to UE 103. The PHY processing module 206 then detects modulated symbols present in these received signals in terms of the hard or soft decisions. The PHY processing module 206 also maps the detected symbols to the specific set of resources within the relay for transmission either to the UE 103 or the BS 102. The PHY processing module 206 also performs frame formatting as specified by the BS 102. The PHY processing module 206 generates pilots and inserts them in the appropriate positions in the formatted frame. The PHY processing module 206 uses the same set of pilots as generated by the BS 102. The formatted frame is transmitted by the relay 101. The PHY processing module 206 also generates a unique identifier associated with the relay 101. The PHY processing module 206 further generates the appropriate System Information (SI). The PHY processing module 206 transmits the unique identifier and the SI, when instructed by the BS 102. Any data or control signals meant only for the relay 101 is processed by the relay in a manner similar to the processing employed at a standard UE terminal.

The UE module 201 further comprises hardware (such as transmitter, receiver, RF chain, buffers, and processor) and software present in a standard user terminal. The UE module 201 presents an interface enabling the relay 101 to communicate with the BS 102, like a typical user terminal. The UE module 201 hardware such as transmitter, receiver and RF chain is also used to communicate with the UE 103.

The memory module 207 as depicted comprises of a data and control buffer, a user database and system information database. The data and control buffer is used as a temporary storage for data and control messages, which are exchanged between the UE 103 and the BS 102. The user database comprises a list of CSG users, who are authorized to associate with the relay 101. The user database may also comprise a list of temporary identities which have been assigned by the BS to UEs associated with the relay 101. The memory module 207 may also comprise a system information database, where information related to the relay 101 such as the relay identifier, synchronization sequences, system frame numbers, list of blacklisted BS and other relevant system information that needs to be transmitted by the relay 101.

The motion sensing module 208 comprises of a sensor for detecting relay mobility and facility to disable/power down the relay when mobility exceeds a preset threshold.

The relay shall comprise of at least one antenna, where the antenna may be a directional antenna, an appropriately beam-formed antenna, an antenna array or any other suitable antenna.

Figure 3:
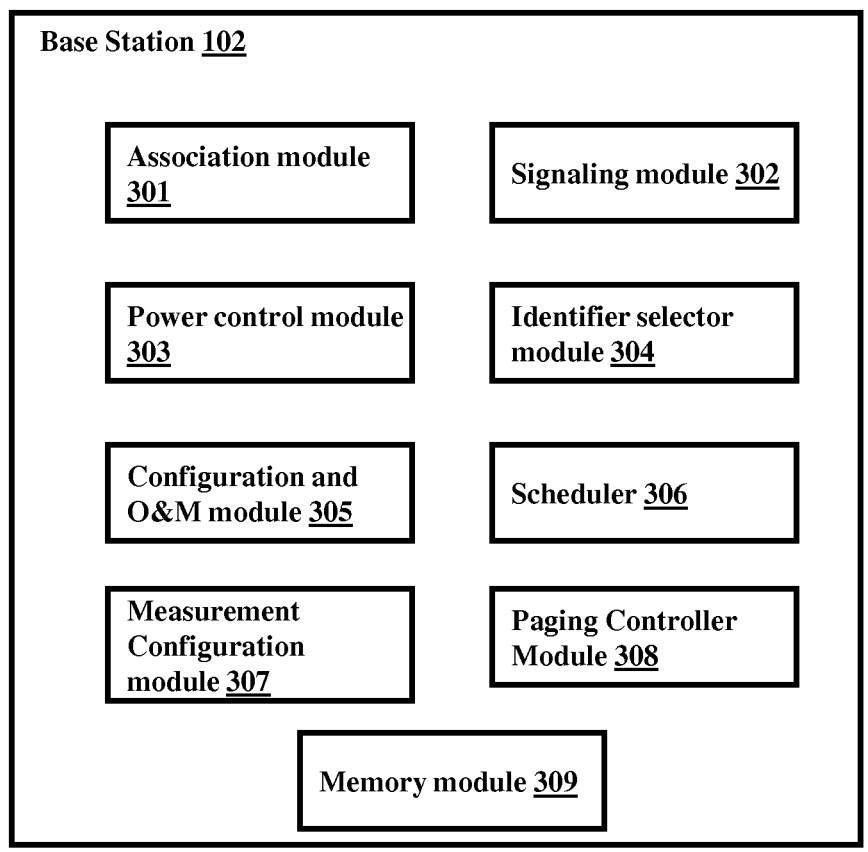
FIG. 3 depicts a base station, according to embodiments as disclosed herein.

FIG. 3 depicts the relay controller (RC) module of a base station, according to embodiments as disclosed herein. The RC of BS 102 comprises of an association module 301, a signaling module 302, a power control module 303, a configuration and O&M module 305, an identifier selection module 304, a scheduler 306, a measurement configuration module 307, a paging controller module 308 and a memory module 309. Besides the RC module, BS 102 also includes the standard BS hardware and software components.

The association module 301 associates a UE 103 with a relay 101, based on a plurality of factors comprising of reported signal strength, CSG group and so on. The association module 301 may also decide to associate the UE 103 with another relay 101, based on measurement reports or other factors. The relay 101 may be associated with the same BS 102 or another BS 102. The association module 301 decides if a relay 101 can associate with the BS 102. The association module 301 may also hand over the relay 101 (where the relay 101 is already associated with the BS 102 or is requesting to be associated with the BS 102) to another BS 102. This may be done for load balancing or for serving a UE 103 served by a neighboring BS 102.

The power control module 303 receives power level information from relay 101 and UE 103. This information is used to decide upon the appropriate power levels for relay 101 and UE 103 for the relay-UE link. The power control module 303 sends control messages to set the level of the transmission power for the link between the relay 101 and the UE 103.

The signaling module 302 is responsible for transferring control messages to the relay 101. The signaling module 302 is also responsible for receiving and processing control messages from the relay 101. The signaling module 302 is used for communicating between BSs, where the communication includes exchange of messages related to relays and handover commands for relays.

The identifier selector module 304 selects an appropriate unique identifier for a relay 101. The unique identifier may be the cell identifier, similar to the one used by BS 102. The unique identifier may also serve as the basis for selecting the reference signals or pilots transmitted by the relay 101. The identifier may be selected by the identifier selector module 304 or may be suggested by the relay with the identifier selector module 304 confirming the validity of the suggested identifier. The identifier selector module 304 also selects an appropriate network identifier for a relay 101. It is unique within the scope of BS 102 and is used only within BS 102 and relays 101 associated with it. The network identifier is used by the BS to distinguish among its relay 101 for the purpose of control signaling, configuration and O&M. If relay 101 is handed over to another BS 102, it is assigned a new network identifier by the BS 102.

The configuration and O&M module 305 configures the operating parameters of the relay after the relay 101 has associated with the BS 102. The configuration and O&M module 305 also performs maintenance of the relay 101 in terms of adjusting the operating parameters of the relay, when the relay is associated with the BS 102. The configuration and O&M module 305 may command the relay 101 to shut down, when triggered by the power control module 303.

The scheduler 306 classifies UEs 103 into a plurality of categories such as victim, safe. A UE 103 is labeled as Victim with respect to a relay 101 or BS 102 if it receives excessive interference from them. A UE 103 is labeled as Safe with respect to a relay 101 or BS 102 if it does not receive excessive interference from them. This classification is done on the basis of measurements reported by the UE 103 to the BS 102. The scheduler 306 will also allocate resources (time slots, frequencies and so on) for transmissions on the link between the relays 101 and UEs 103. The scheduling for the link between BS 102 and relay 101 is performed like the scheduling for a UE using the scheduling unit already present in the BS functionality module.

The measurement configuration module 307 adds unique identifiers of relays to the neighboring BS list broadcast by the BS 102. The measurement configuration module 307 also adds unique identifiers of the relay 101 to the list of identifiers of BSs 102 to be scanned by a UE 103. The measurement configuration module 307 also triggers the transmission of the unique identifier and other relevant information such as pilots/reference signals, synchronization signals and system information by the relays 101 included in the list of BS identifiers.

The paging control unit 308 sends a page to an idle relay 101, when the paging control unit 308 detects a UE 103 in the vicinity of the relay 101. The relay may go into idle mode when there's no data to transmit or receive. In idle mode, the relay is not detached from the serving BS at any point of time and its context is preserved in the BS. The relay is said to be in active mode when it's powered on and not idle.

The memory module 309 comprises of a database for relays 101, with each relay 101 associated to the BS 102 having a distinct entry. The information present comprises of identifiers for the relays 101 (comprising of CSG identifier, network identifier and the unique identifier associated with the relay 101). The CSG list associated with each relay 101 may also be present within the memory module 309. The memory module 309 also comprises of identifiers for other BSs to which the relay 101 may be associated to simultaneously. The memory module 309 also contains a list of UEs associated with each relay 101 and the capabilities of each of the relays 101. This information may be retained in the BS even after the relay is no longer attached/associated with the BS, for a specified period of time.

In addition to the above mentioned modules, the BS 102 comprises of the modules which are normally present within a BS 102 and are necessary for its functioning. The above mentioned modules may interact with the other modules of the BS 102, as and when required.

Figure 4:
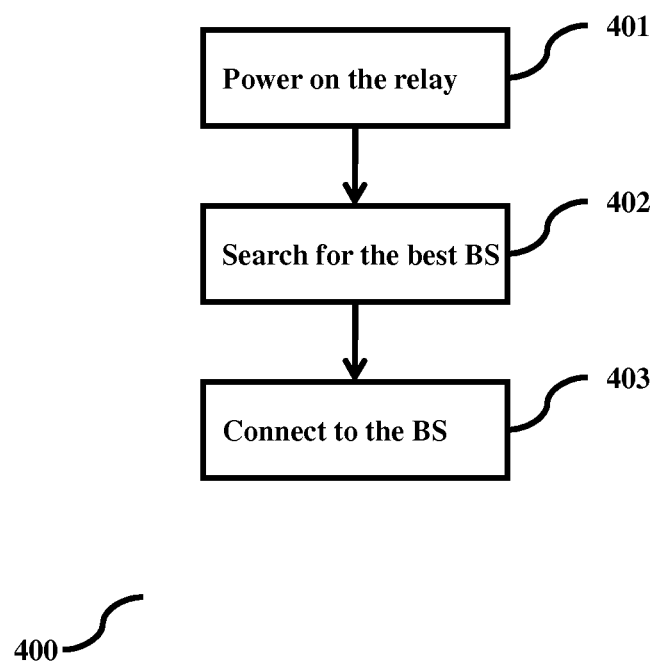
FIG. 4 depicts a relay associating to a BS, according to embodiments as disclosed herein.

FIG. 4 depicts a relay connecting to a BS, according to embodiments as disclosed herein. The relay 101 is powered on (401). The relay 101 then searches (402) for the best BS 102. The best BS 102 may be the BS 102 which has the highest signal strength as seen by the relay 101. The relay 101 connects (403) to the best BS 102, after deciding the best BS 102. The various actions in method 400 may be performed in the order presented, in a different order or simultaneously. Further, in some embodiments, some actions listed in FIG. 4 may be omitted.

Figure 5:
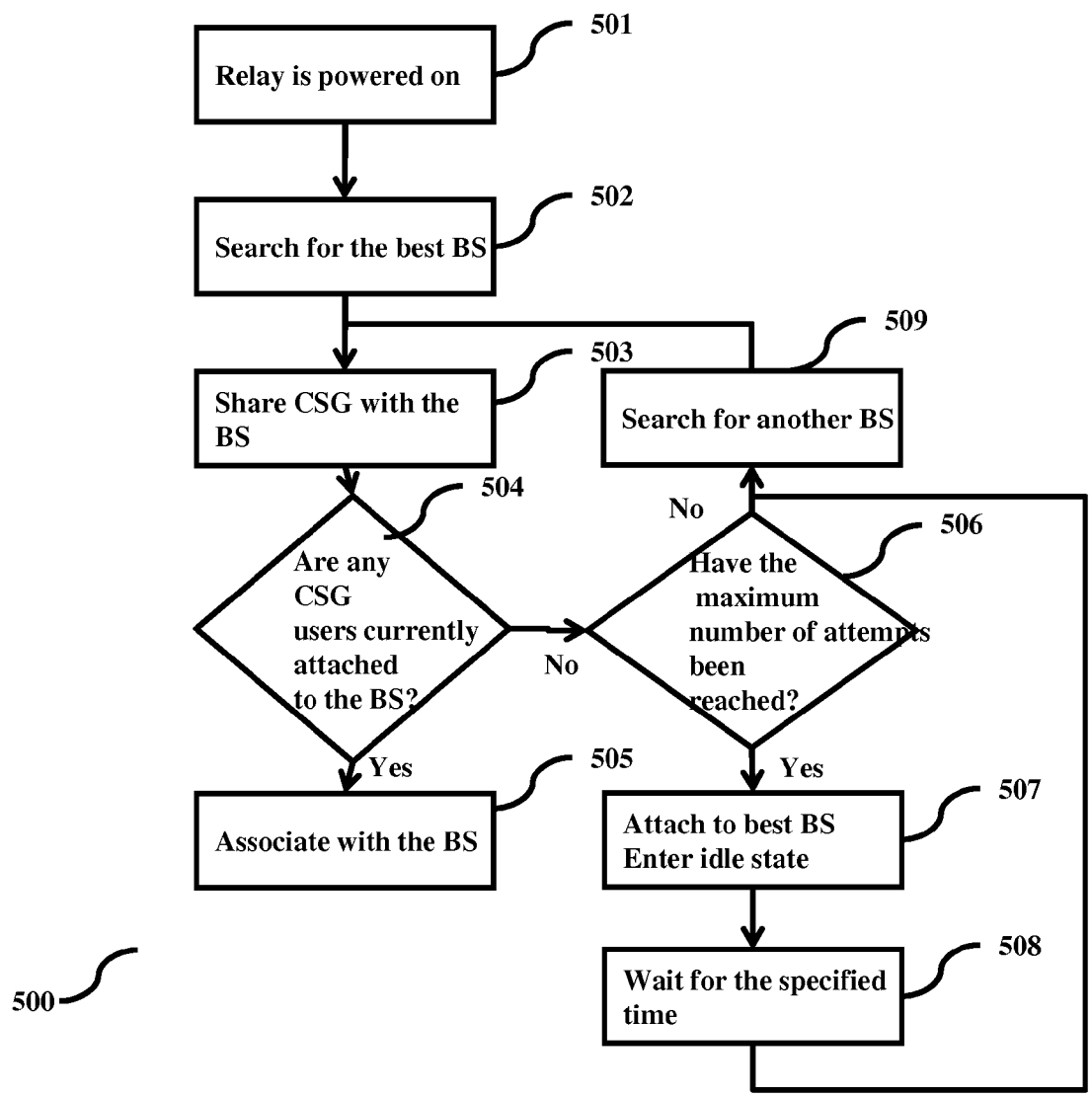
FIG. 5 depicts a relay associating to a BS, according to embodiments as disclosed herein.

FIG. 5 depicts a relay connecting to a BS, according to embodiments as disclosed herein. The relay 101 is powered on (501). The relay 101 then searches (502) for the best BS 102. The best BS 102 may be the BS 102 which has the highest signal strength as seen by the relay 101. Once the relay 101 finds the best BS 102, the relay 101 shares (503) the CSG list with the best BS 102. The BS 102 checks (504) if any UEs from the CSG list of relay 101 are presently connected to the BS 102 and reports back to relay 101 If none of the UEs from the CSG list are presently connected to the BS 102 and the maximum number of attempts have not been (506) reached, the relay 101 searches (509) for another BS 102 and repeats steps 503-504 till the required BS 102 is found or the maximum number of attempts have been reached. If the required BS 102 is not found and the maximum number of attempts have been reached, the relay 101 associates with the best BS and then enters (507) into idle state and waits (508) for a specified period of time. In either case, the relay 101 may search (509) for a BS 102 with active CSG UEs 103 again after a specific period of time. If at least one UE from the CSG of the relay is connected to the BS 102, the relay 101 connects (505) to the BS 102. In another embodiment herein, the relay 101 powers down after (506) if it does not find a best BS 102 to associate with instead of going into idle mode. It may power on after a specified period of time and repeat the whole procedure. In another embodiment herein, the relay 101 may connect to more than one BS 102. In this case, whenever a BS 102 detects a CSG UE in the proximity of the relay 101, the BS 102 pages the relay 101. The various actions in method 500 may be performed in the order presented, in a different order or simultaneously. Further, in some embodiments, some actions listed in FIG. 5 may be omitted.

Figure 6:
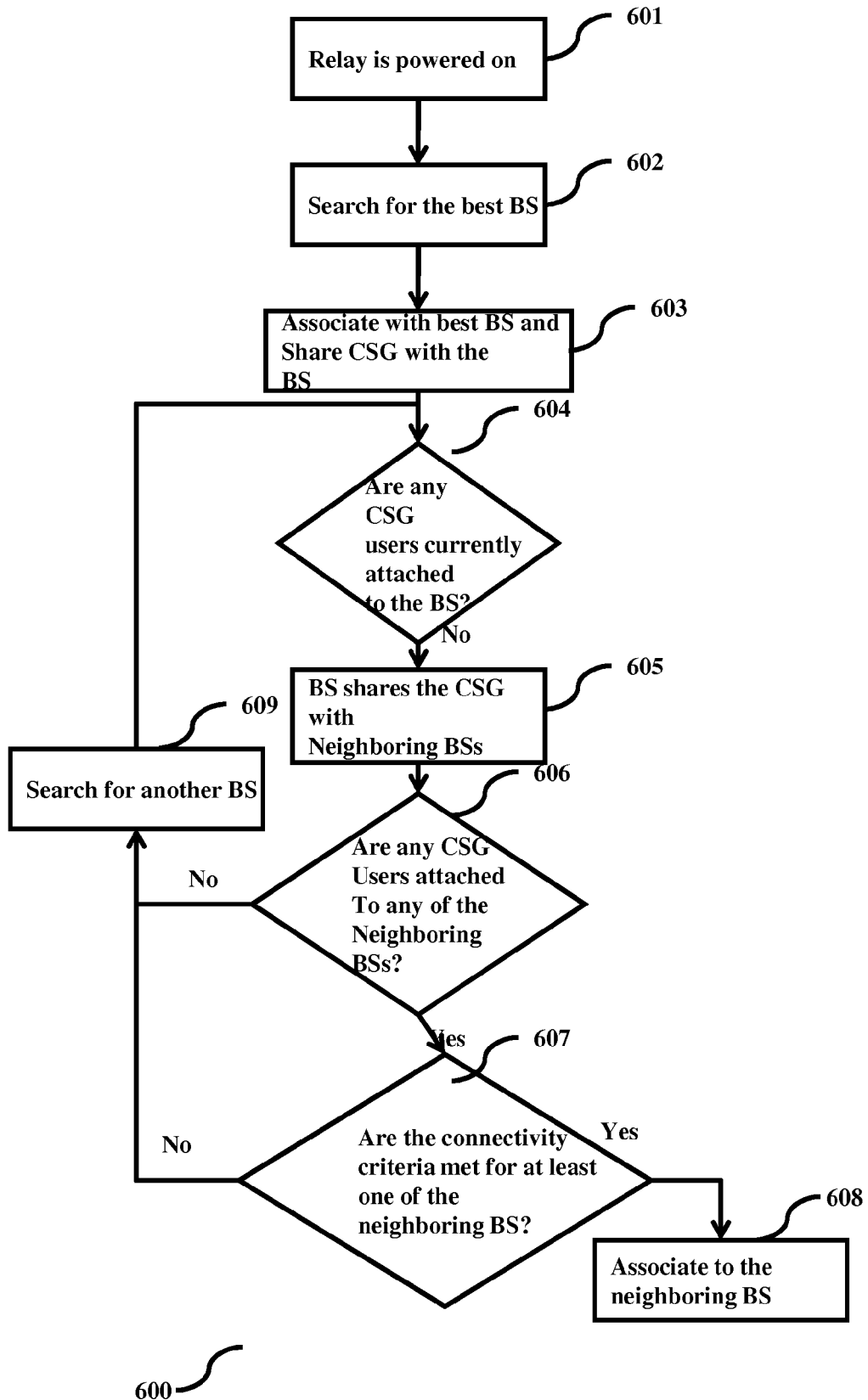
FIG. 6 depicts a relay associating to a BS, according to embodiments as disclosed herein.

FIG. 6 depicts a relay connecting to a BS, according to embodiments as disclosed herein. The relay 101 is powered on (601). The relay 101 then searches (602) for the best BS 102. The best BS 102 may be the BS 102 which has the highest signal strength as seen by the relay 101. Once the relay 101 finds the best BS 102, it associates with the best BS 102 and then shares (603) the CSG list with the best BS 102. BS 102 checks (604) if any UEs from the CSG are presently connected to it. If at least one of the CSG UEs is connected to the BS 102, the relay 101 should complete the association procedure. If none of the UEs from the CSG list of the relay are connected to the BS 102, the BS 102 shares (605) the CSG list with the neighboring BSs and the BS 102 checks (606) if any UEs from the CSG are presently connected to any of the neighboring BSs. If at least one UE 103 is connected to one of the neighboring BSs, then the BS 102 checks (607) if the connectivity criteria (such as radio link quality, proximity of the UE to the relay 101) are met. If the criteria are met, the relay 101 associates with BS 102. If more than one BS 102 meets the criteria, the relay 101 shall select only one of the BS 102. If the required neighboring BS 102 is not found, the BS 102 may attempt steps 604-607 after a specific period of time. The various actions in method 600 may be performed in the order presented, in a different order or simultaneously. Further, in some embodiments, some actions listed in FIG. 6 may be omitted.

The association criteria can include factors such as Proximity of the UE 103 to the relay 101, signal strength of link between UE 103 and relay 101, signal strength of link between the relay 101 and serving BS 102 of the UE 103, number of UEs already associated with the relay 101, If Quality of Service parameters of UE 103 can be met while serving UE 103 through the relay.

Once the relay 101 has attached with the BS 102, the relay 101 registers with the BS 102 as a relay using a control message and completes the association procedure. In another embodiment herein, the relay 101 may connect to the communication network using a similar method as L3 relays.

The relay 101 aperiodically transmits its own identifier, pilots/reference signals, synchronization signals and system information when directed by the BS 102 using a control message. The BS 102 may trigger the relay 101 to transmit the unique identifier and relevant information pilots/reference signals, synchronization signals and system information whenever an authorized UE performs network entry while being in the vicinity of the relay 101. The BS 102 may determine if a UE 103 is in the coverage area of the relay 101 based on location information available to the BS 102. Additionally, the UE 103 may also use CSG proximity indication to inform the BS 102 that it approaching the relay 101. In the absence of precise location info, the BS 102 may ask the relay 101 to transmit the unique identifier when the authorized UE 103 enters the cell/sector. In addition, the BS 102 will request the relay 101 to transmit the unique identifier and relevant information whenever any attached UE requests the BS 102 for interval to perform interference measurement or when the BS 102 wants a UE 103 to make interference measurements on the relay 101 In addition, the relay 101 may be configured by the BS 102 to measure interference from other relays 101. In this case also, the other relays 101 will be commanded by the BS 101 to transmit the unique identifier and relevant information. The BS 102 can command the relay 101 to transmit the unique identifier and the relevant information based on a request from a neighboring BS 102.

A set of unique identifiers (or preambles) may be reserved by the BS 102 to be assigned temporarily to the relays 101 associated with the BS 102. These unique identifiers enable the UE 103 to uniquely identify the relay 101 for both association and interference measurements. Non-colliding identifiers have to be assigned to the relays 101 such that the identity of a relay 101 can be uniquely determined. One way for achieving this includes a mechanism wherein the relay 101 detects a suitable identifier via sensing identifier transmissions from other relays and the BS 102. Once an identifier is found, the relay 101 will request the BS 102 to assign the identifier to it using a control message. In another embodiment herein, the BS 102 determines a suitable identifier after excluding the identifiers used by its neighboring BS 102 and other relays 101 in the same cell. The new identifier should have very low cross correlation with the identifiers already used by the BS 102, and also the identifiers of other BSs and Relays in its vicinity. It may be possible to take the identifiers from the identifiers reserved for femtos.

The relay 101 aperiodically transmits signals (e.g. Identifiers, Sync signals, Pilots/Reference Signals etc) which enable the UEs to identify the relay 101 uniquely. Whenever the relay 101 is commanded to transmit unique identifier and other system information, it may indicate that the cell is barred for the UE 103. This will force the UE 103 to attach to a BS 102, as per standard procedure. Barring here means that UE is not allowed to camp on the cell.

In another embodiment herein, the relay 101 may signal a list of blacklisted BSs 102 to the UE 103. This list includes all BSs 102 except for the one which is serving the relay 101. The UE 103 will not attempt to attach with any of the blacklisted BSs 102, thereby forcing the UE 103 to select the serving BS 102 of the relay 101 for network entry.

Once the UE 103 is attached to the serving BS 102, procedures for associating UE with relay may be applied by the BS.

Figure 7:
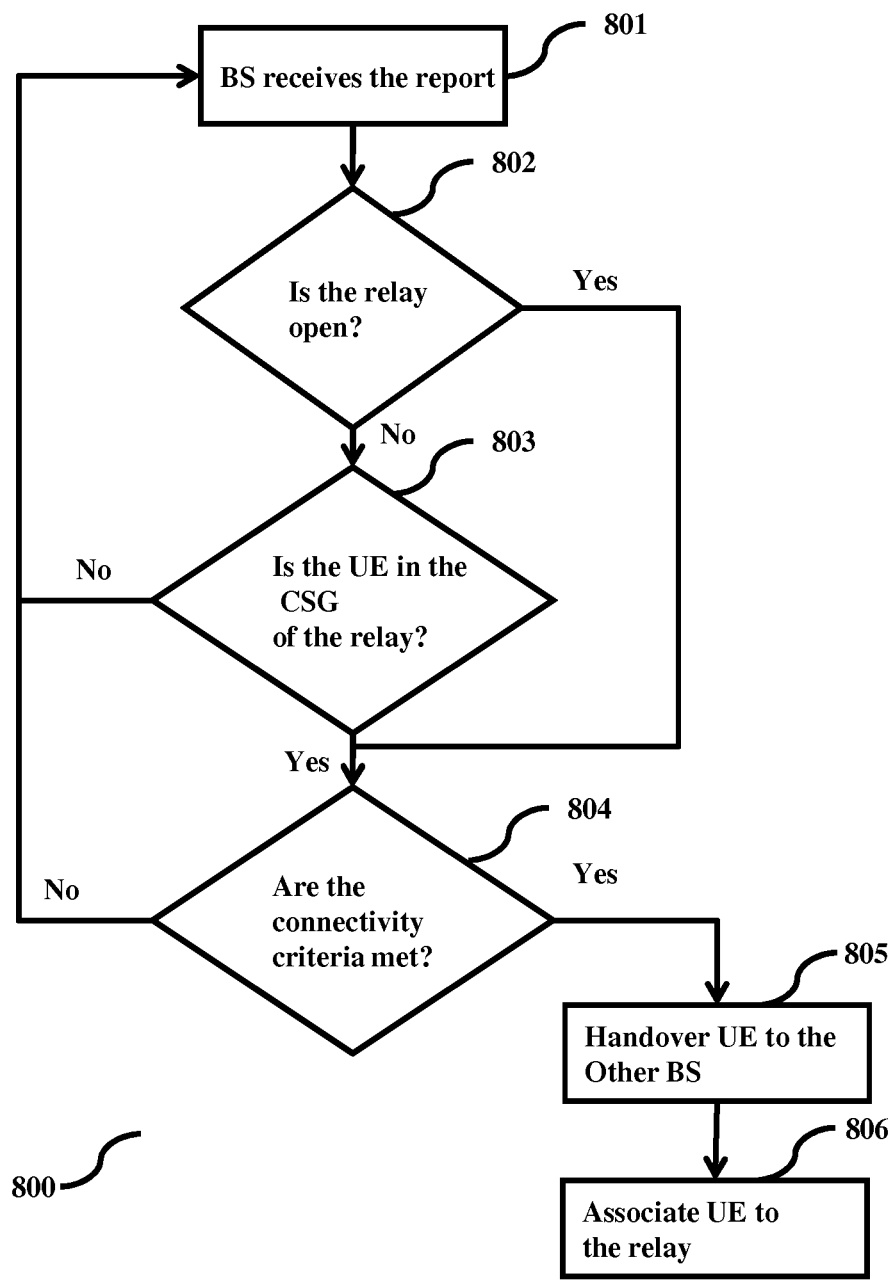
FIG. 7 depicts a method where a UE associates with a relay, according to embodiments as disclosed herein.

FIG. 7 depicts a method where a UE associates with a relay, according to embodiments as disclosed herein. Once the UE 103 attaches (701) to a BS 102, the relay 101 (where the UE 103 is present within the coverage area of the relay 101) transmits (702) the identifier, which is done at the command of the BS 102. The UE 103 detects (703) the signal strength of the transmission from the relay 101 and sends (704) a report to the BS 102. The BS 102 checks (705) if the relay 101 is not open i.e., the relay 101 has a CSG list defined. If the relay 101 has a CSG list, then the BS 102 checks (706) if the UE 103 is present in the CSG list of the relay 101. If the relay 101 does not have a CSG list or the UE 103 is present in the CSG of the relay 101, then the BS 102 checks (707) if the relay 101 meets the connectivity criteria (such as radio link quality, proximity of the UE to the relay 101). If the connectivity criteria are met, then the UE is associated with (708) the relay 101 and the relay 101 are informed about the associated UE and its related information. The various actions in method 700 may be performed in the order presented, in a different order or simultaneously. Further, in some embodiments, some actions listed in FIG. 7 may be omitted.

Figure 8:
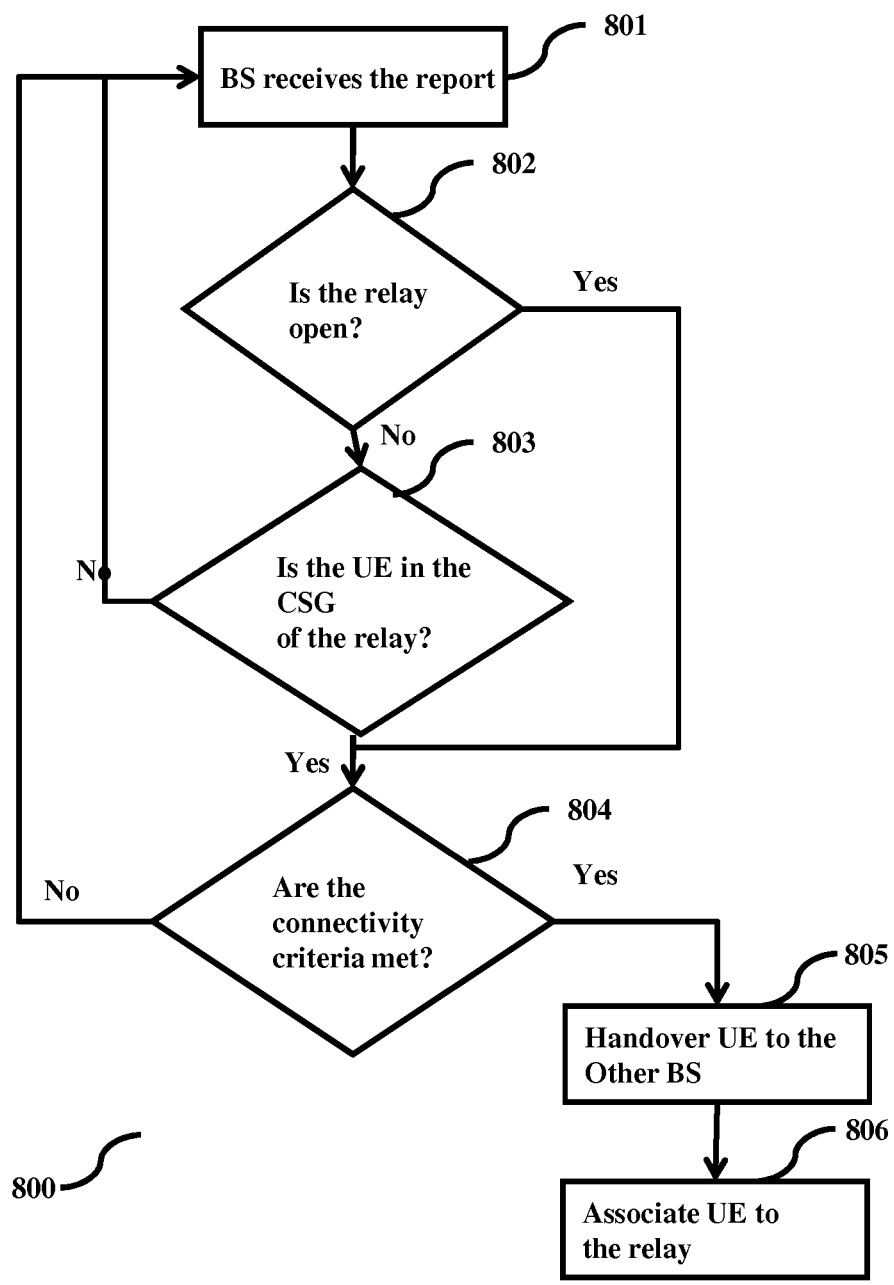
FIG. 8 depicts a method where a UE associates with a relay, according to embodiments as disclosed herein.

FIG. 8 depicts a method where a UE associates with a relay, according to embodiments as disclosed herein. The BS 102 receives (801) a report from the UE 103 regarding the signal strength of a relay associated with a neighboring BS 102. The BS 102 checks (802) if the relay 101 is not open i.e., the relay 101 has a CSG list defined. If the relay 101 has a CSG, then the BS 102 checks (803) if the UE 103 is present in the CSG list of the relay 101. If the relay 101 does not have a CSG or the UE 103 is present in the CSG of the relay 101, then the BS 102 checks (804) if the relay 101 meets the connectivity criteria (such as radio link quality, proximity of the UE to the relay 101). If the connectivity criteria are met, then the BS 102 handovers (805) the UE 103 to the neighboring BS and the UE 103 is associated (806) with the relay 101. The various actions in method 800 may be performed in the order presented, in a different order or simultaneously. Further, in some embodiments, some actions listed in FIG. 8 may be omitted.

The association criteria can include factors such as Proximity of the UE 103 to the relay 101, signal strength of link between UE 103 and relay 101, signal strength of link between the relay 101 and serving BS 102 of the UE 103, number of UEs already associated with the relay 101, If Quality of Service parameters of UE 103 can be met while serving UE 103 through the relay.

The BS 102 may send control signals and data to the relays 101. The control signals may be for the relay 101 or it has to be forwarded by the relay 101 to the UE 103. Similarly, the data signals may be for the relay 101 or has to be forwarded by the relay 101 to the UE 103. The BS 102 may inform the relay 101 using a dedicated control message about the signalling and data which is to be forwarded to UEs 103. Alternatively, the relay 101 can also acquire the information by reading the resource allocation messages sent by the BS 102 to the UE 103. In some cases, the relay 101 can do this only if it knows the UE-specific code used to scramble the resource allocation information. This code maybe sent by a BS 102 to the relay 101 using a control message.

Figure 9:
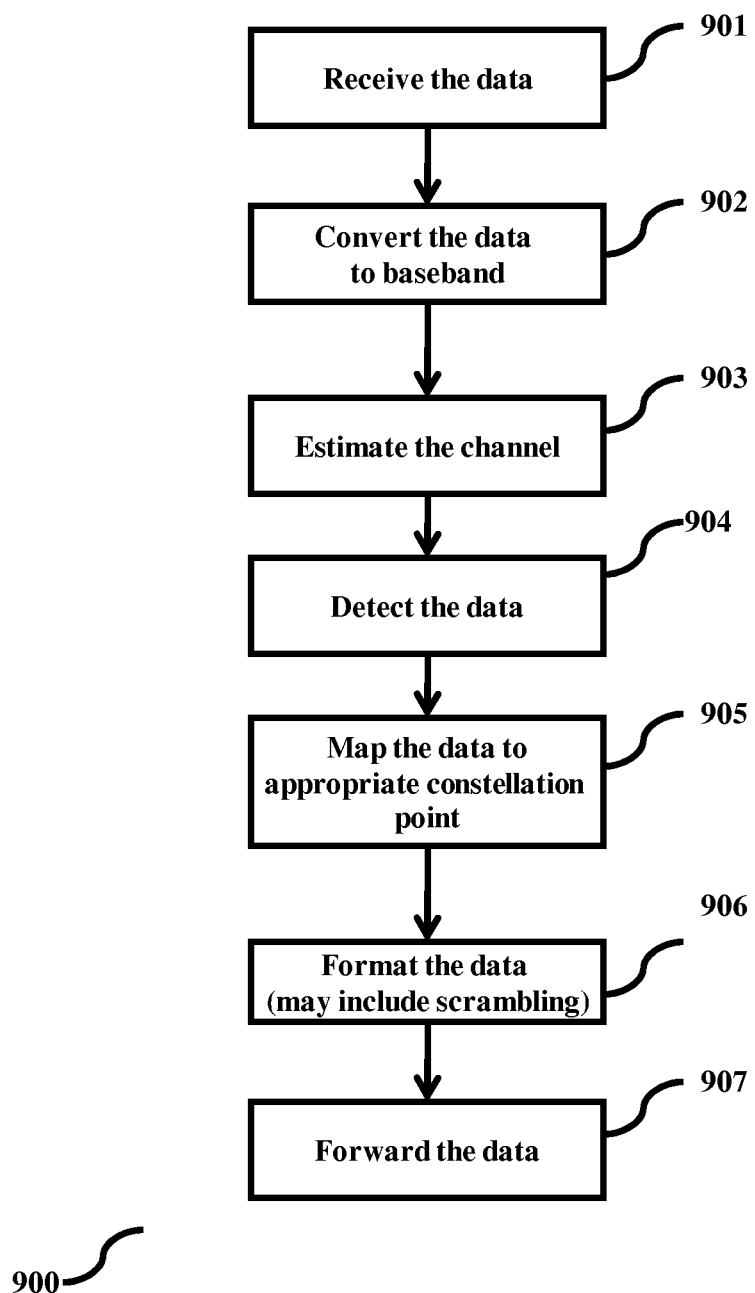
FIG. 9 depicts the relay processing received data, according to embodiments as disclosed herein.

FIG. 9 depicts the relay processing received data, according to embodiments as disclosed herein. The relay 101 receives (901) data. The relay 101 may receive the data from the BS 102 or the UE 103. The relay 101 converts (902) the data into baseband, estimates (903) the channel (in terms of channel quality based on the received pilot/reference signals) and detects (904) the data. The relay 101 may map (905) the detected soft data to appropriate constellation points (hard data). The relay 101, formats (906) the frame by inserting the pilot signals along with the estimated data appropriately and transmits (907) the frame to the destination (may be the BS 102 or the UE 103) using appropriate resources (time-frequency, codes and so on). The relay 101 as disclosed herein does not perform any additional channel decoding/encoding on the data/signaling that it forwards between UE and BS. It may be noted that the relay 101 also does not perform any form of Hybrid ARQ (HARQ) processing on the data/signaling that it forwards between the BS and UE, implying that HARQ is end to end. The various actions in method 900 may be performed in the order presented, in a different order or simultaneously. Further, in some embodiments, some actions listed in FIG. 9 may be omitted.

In certain systems, data from/to the UE 103 is scrambled with a time-dependent sequence. Therefore when data is being forwarded by the relay from the BS to the UE, if there is processing/scheduling delay at the relay, the detected data needs to be reformatted taking into account the time-dependent scrambling sequence. This further requires the BS 102 to send the sequence to the relay and makes it mandatory for the relay to make hard decision, demodulate, descramble and re-scramble with the new time dependent scrambling sequence and then modulate before formatting the frame for transmission to the UE 103. This could result in error propagation and added complexity which can be avoided if the BS 102 can scramble the data with a scrambling sequence corresponding to the time instant when relay forwards the data to the UE 103. As the relay transmissions are scheduled by the BS 102, it knows the exact time instant when the relay will forward the data.

In the case of uplink transmissions via relay, the BS 102 will choose the appropriate sequence for descrambling data from the UE 103, taking into account the delay at the relay 101.

The BS 102 indicates the resources on which the relay 101 has to forward data to a UE 103. This indication may be explicitly signalled for each frame/subframe or multiples thereof or it can be pre-defined semi-statically by the BS 102 as a system parameter for each relay 101. In both cases, a control message has to be sent by the BS 102. The allocation of resources may involve specifying a specific set of resources available to a relay 101 or a specific set of resources on which the relay 101 is not allowed to transmit. The resources are specified in terms of time slots, frequencies, codes (including a combination of these). FIG. 10 illustrates the different scheduling options. In FIG. 10, the relay 101 can transmit the data immediately after receiving it, i.e. at the next transmission opportunity (depicted in FIG. 10(a) and FIG. 10(b)). The transmission may be done using the same (as in FIG. 10(a)) or different set of frequency resources (FIG. 10(b)), as used by the BS. In FIG. 10, frequencies f1, f2 etc, may refer to sub-carriers of the same or different carriers. In another embodiment herein, the relay 101 may forward the received data with a variable delay (w.r.t. the time of reception), on the same or different set of frequency resources (as in FIG. 10(c)).

The BS 102 may determine the quality of the link between the relay 101 and the UE 103 based on information about received power levels or any other relevant measurements from both the relay 101 and the UE 103. The relay 101 may forward any information it has about this link between the UE 103 and relay 101 to the BS 102 using a control message. For example, the relay 101 could measure the path loss from the UE sounding channel. Based on these reported measurements, the power control of the UE-relay link may be determined by the BS 102 in a fine/coarse manner. The BS 102 can configure interference measurement reporting (using existing control messages) from both the UE 103 and the relay 101 in order to use the measurements for power control as well as relay-BS association and UE-relay association. The relay 101 may autonomously set and modify its downlink transmit power if it has information available about the link, e.g. using sounding reference signals transmitted by the UE 103. However, the master control is with the BS 102 which can override the setting configured by the relay 101 via a control message. The BS 102 can also switch on/off the radio link between the relay 101 and the UE 103. The uplink transmit power of relay 101 controlled by the BS 102, as is done for UEs. When control signalling is received directly from the UE 103 by the BS 102, the UE uplink power for this link is controlled by BS 102 in conventional manner.

Figure 11:
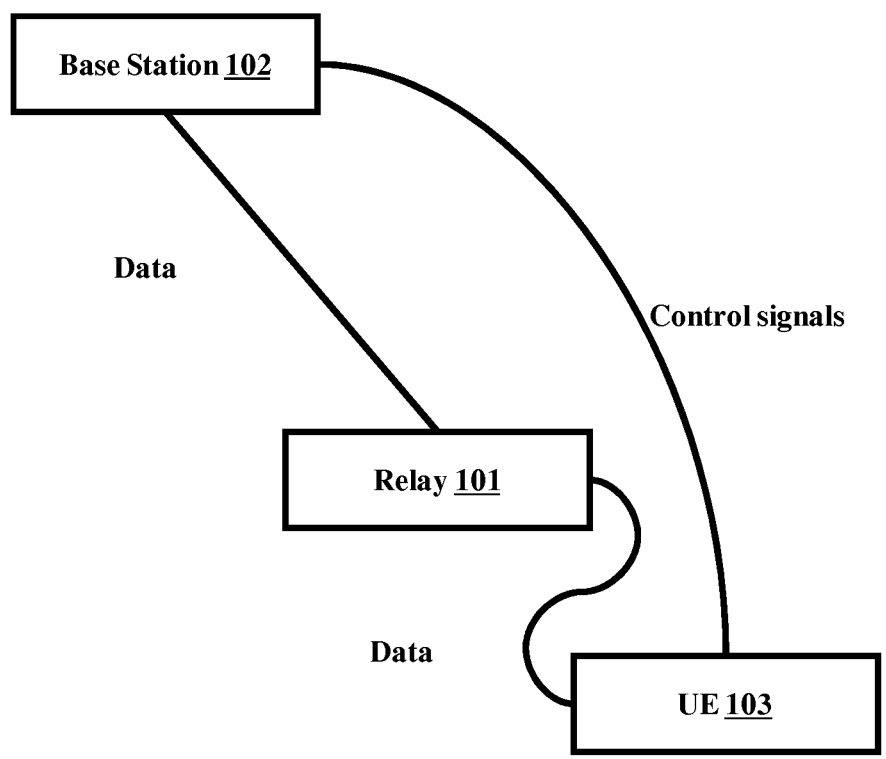
FIG. 11 depicts the control signals being exchanged between the UE and the BS directly, according to embodiments as disclosed herein.

FIG. 11 depicts the control signals being exchanged between the UE and the BS directly.

Figure 12:
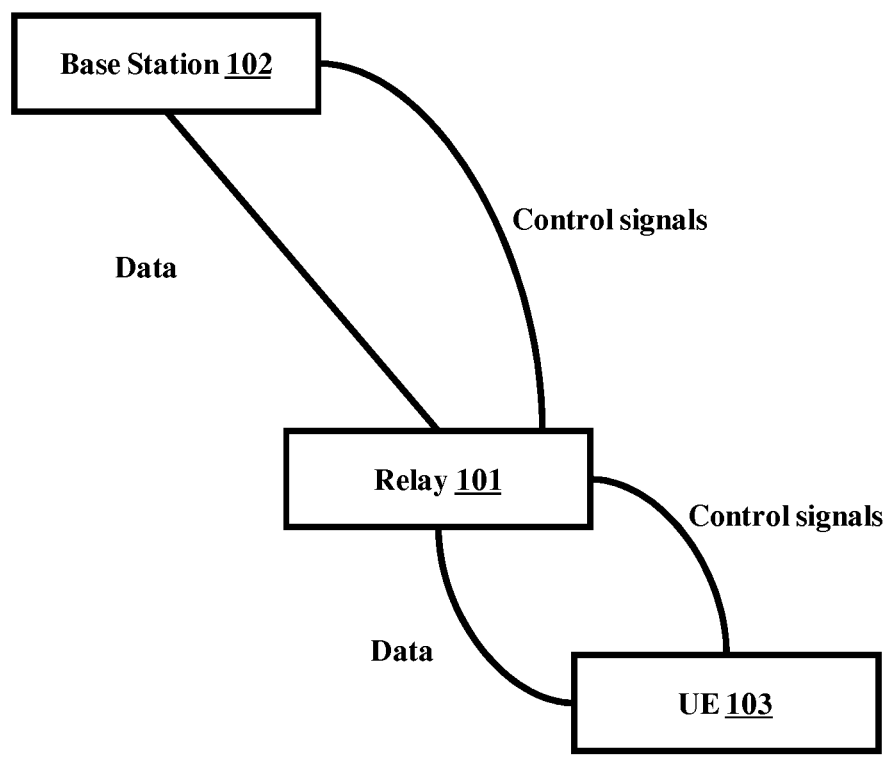
FIG. 12 depicts the control signals being exchanged between the UE and the Bs via the relay 101, along with the data signals, according to embodiments as disclosed herein.

FIG. 12 depicts the control signals being exchanged between the UE and the Bs via the relay 101, along with the data signals.

The decision to associate a UE 103 with a relay 101 is taken by its serving BS based on measurements reported by the UE 103. These measurements are done on identifier/pilots/reference signals transmitted the relay 101, when asked by its serving BS 102.

Figure 13:
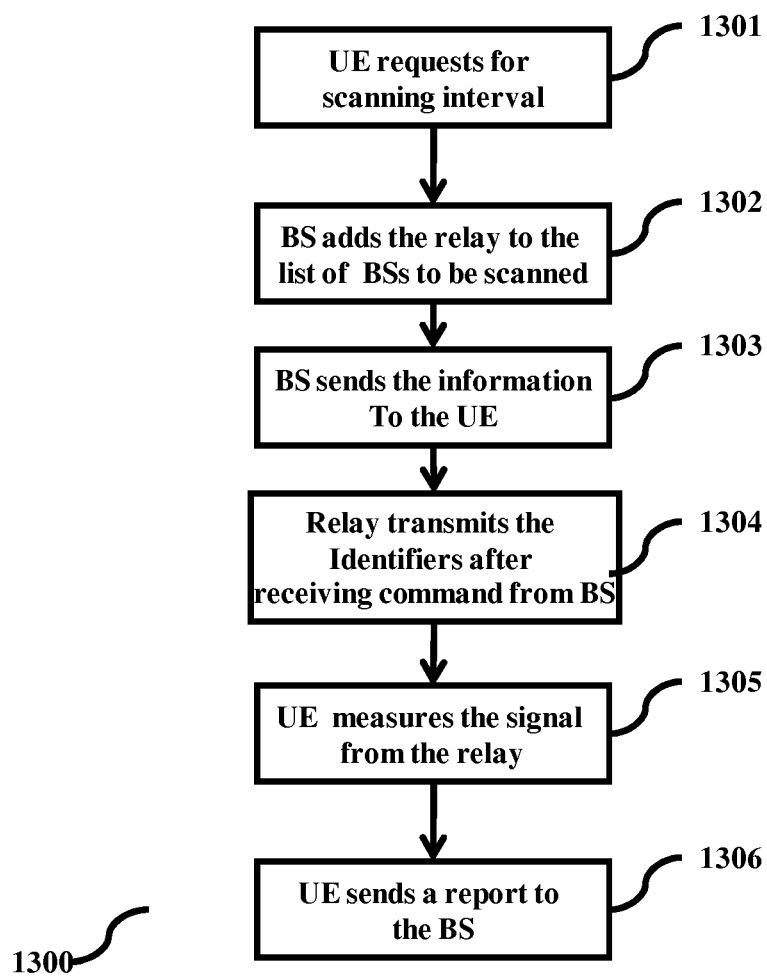
FIG. 13 depicts a method for addition of the relay to the list of BS to be measured by UE in the vicinity of the relay, according to embodiments as disclosed herein.

FIG. 13 depicts a method for addition of a relay 101 to the list of BS to be measured by a UE 103, according to embodiments as disclosed herein. The UE 103 requests (1301) the BS 102 for the scanning interval, where the scanning interval refers to the interval when the UE performs signal strength measurement on a specific set of BS 102 and relay 101. The BS 102 adds (1302) the relays to the list of BSs to be scanned and sends (1303) the list along with the scanning interval to the UE 103. The relays 101 then transmit (1304) their identifiers upon receiving a trigger from the BS 102. The UE 103 measures (1305) the signal received from the relay 101 and sends (1306) a report to the BS 102. This report may include measurements of other BS 102 in the list. The various actions in method 1300 may be performed in the order presented, in a different order or simultaneously. Further, in some embodiments, some actions listed in FIG. 13 may be omitted.

Figure 14:
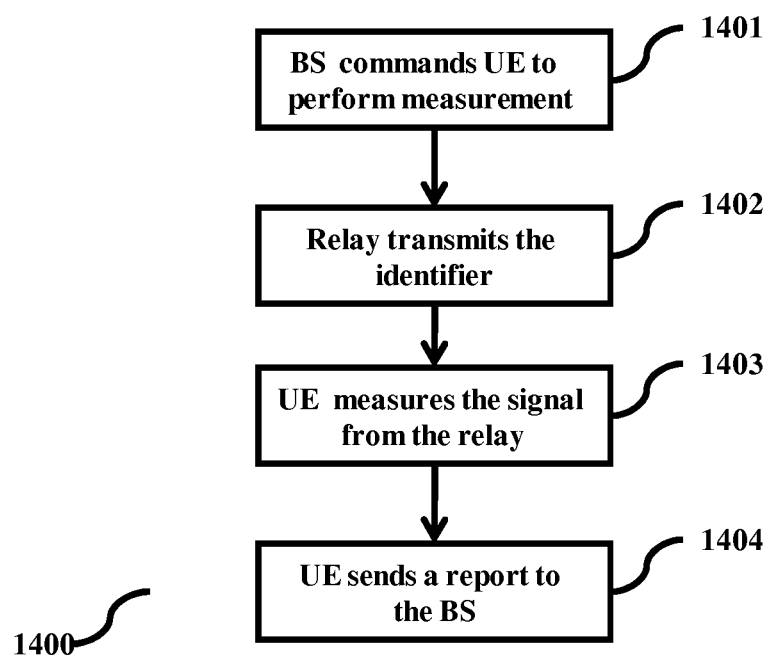
FIG. 14 depicts a method for addition of the relay to the list of BS to be measured by UE in the vicinity of the relay, according to embodiments as disclosed herein.

FIG. 14 depicts a method for addition of the relay to the list of BS to be measured by UE in the vicinity of the relay, according to embodiments as disclosed herein. The BS 102 commands (1401) the UE to perform measurements, where the UE is requested to identify and measure the relays attached to the UE 103, which can be done using existing messages and metrics. The relay 101 then transmits (1402) its identifiers upon receiving a trigger from the BS 102. The UE 103 measures (1403) the signal received from the relay 101 and sends (1404) a report to the BS 102. The neighbor BS list which is periodically broadcast by BS 102 may also include relays 101. The various actions in method 1400 may be performed in the order presented, in a different order or simultaneously. Further, in some embodiments, some actions listed in FIG. 14 may be omitted.

Since the relay 101 also behaves like a UE, it may go into idle mode when there's no data to transmit or receive. However, unlike a UE, the relay 101 will not be detached from the serving BS at any point of time, unless it is shut down.

When a user is served by a BS that is also serving the relay 101 (in idle mode), the latter may be woken up. BS may page the idle relay 101, when the UE is in its vicinity.

Direct handover to the relay 101 as such may not be permitted. However, the relay 101 will be informed about the associated UEs by serving BS.

Handover of relay 101 from one BS to another BS is allowed. Such a handover may occur during the relay's initial attachment itself. In addition, the serving BS may handover the relay 101 to another BS for load balancing. In this case, all the UEs associated with the relay 101 are also handed over to the target BS. Whenever a relay 101 is handed over to the target BS, all the associated UE also have to be handed over to the target BS. One criterion for deciding whether a relay 101 should be handed over to a target BS 102 may the link quality between the UEs already associated with the relay 101 and the target BS 102. Another criterion is the willingness of the target BS 102 to accept the UEs 103 already associated with the relay 101.

The process of achieving relay O&M is implementation specific. Also, since the relay 101 also acts as UE, it will be authorized by AAA. Hence, any type of O&M facility could be built into the relay 101.

Embodiments disclosed herein enable the relevant UEs to have a high SINR link with the relay. This, in turn, translates to a better effective link quality between the UE and BS and higher indoor rates, which otherwise may have been not as good as a consequence of poorer direct link between the UE and the BS. This relay is effectively transparent to the UE. The deployment of relays also implies minimal impact on UE IOT.

The association procedures (between UE-relay and BS-relay) described here are not limited to estimate-and-forward relays. These can also be used for any network entity which resides between the BS and UE and does not necessarily implement the full BS protocol stack and related functionality. Typical examples of such devices available right now are repeaters, conventional relays (such as amplify-and-forward, estimate-and-forward, demodulate-and-forward, decode-and-forward) and remote radioheads etc. In some cases, a UE can also act like a relay.

For example, in the methods illustrated in FIGS. 5, 6, 7 and 8, the relay can be a repeater, remote radiohead, conventional relay, L3 relay or a UE. As far as the association procedures are concerned, the term relay refers to any network entity which resides between the BS and UE and does not necessarily implement the full BS protocol stack and related functionality.

The embodiments disclosed herein can be implemented through at least one software program running on at least one hardware device and performing network management functions to control the network elements. The network elements shown in FIGS. 1, 2, 3, 11 and 12 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A method to enable a relay to associate with a best Base Station (BS) in a wireless communication network, said method comprising of:
   said relay searching for said best BS;
   said relay attaching to said best BS;
   said relay sending list of Closed Subscriber Group (CSG) UEs to said best BS;
   said best BS checking if at least one of said CSG UEs is attached to said best BS;
   said relay completing association procedure with said best BS if at least one CSG UE is attached to said best BS;
   said relay associating with said best BS if no BS with at least one said CSG UE is found when a pre-specified number of association attempts have been reached;
   said relay entering into an idle mode; and
   said relay entering into an active mode, on receiving a message from said best BS that at least one said CSG UE is detected in vicinity of said relay.

2. The method, as claimed in claim 1, wherein said method further comprises of:
   said relay checking if a pre-specified number of failed association attempts have been reached, if said best BS did not have at least one CSG UE attached to it or said relay cannot associate with said best BS; and
   said relay attempting to associate with next best BS, if said pre-specified number of failed association attempts have not been reached.

3. The method, as claimed in claim 1, wherein said method further comprises of said relay powering down for a pre-specified time period after said pre-specified number of failed association attempts has been reached.

4. The method, as claimed in claim 1, wherein said method further comprises of:
   said relay associating with a plurality of BSs if no BS with at least one said CSG UE is found when said pre-specified number of association attempts have been reached;
   said relay entering into idle mode; and
   said relay associating with one BS from said plurality of BSs, on receiving a message from said one BS that at least one CSG UE is detected in vicinity of said relay.

5. The method, as claimed in claim 1, wherein said best BS assigns a unique identifier to said relay, on said relay completing association procedure with said best BS.

6. The method, as claimed in claim 1, wherein said relay registers capabilities of said relay with said best BS, on said relay completing association procedure with said best BS.

7. The method, as claimed in claim 1, where said relay is assigned with a network identifier, on said relay completing association procedure with said best BS.

8. The method, as claimed in claim 1, wherein said best BS sends a control message to said relay instructing said relay to power down when said relay has not served any UEs for a specified period of time.

9. The method, as claimed in claim 1, wherein said best BS sends a control message to said relay instructing said relay to power down when said relay is causing excessive interference.

10. The method, as claimed in claim 1, wherein said relay powers down when said relay detects that mobility level of said relay has crossed a predefined threshold.

11. A method for enabling a User Equipment (UE) attached to a Base Station (BS) in a communication network to communicate with said BS via a relay associated with said BS, said method comprising of:
   said BS checking if said UE is authorized to associate with said relay, on detecting said UE in coverage area of said relay, wherein said UE is associated with said BS; and
   said BS instructing said UE to perform measurements on said relay;
   said BS instructing said relay to transmit a signal comprising of unique identifier of said relay and relevant system information;
   said UE making measurements on basis of said signal received from said relay;
   said UE reporting said measurements to said BS;
   said BS deciding if said relay meets criteria required to serve said UE, based on said measurements received from said UE;
   said BS associating said UE with said relay, if said relay meets criteria required to serve said UE;
   said BS informing said relay about said UE, on said BS deciding that said UE can be served by said relay;
   said BS sharing UE-related information with said relay;
   wherein said relay converting said received information into baseband;
   said relay performing channel estimation on said received information;
   said relay equalizing said information using said channel estimation;
   said relay making hard decisions on said equalized information;
   said relay constructing frame using said at least one of said equalized information or said hard decisions;
   said relay generating pilots and inserting said pilots in said frame; and
   said relay transmitting said frame.

12. The method, as claimed in claim 11, wherein said method further comprises of:
   said relay sending information received from said BS to said UE, where said information is at least one of data or control signals and where destination of said received information is said UE; and
   said relay sending information received from said UE to said BS, where said information is at least one of data or control signals and where destination of said received information is said BS.

13. The method as claimed in claim 11, wherein said relay making said hard decisions comprises of:
   said relay demodulating said equalized information;
   said relay descrambling said demodulated information;
   said relay rescrambling said de-scrambled information using a scrambling sequence, wherein said BS informs said relay of said scrambling sequence; and
   said relay modulating said scrambled information.

14. The method, as claimed in claim 11, wherein said BS selects a scrambling sequence for scrambling the data before transmission of said data to said relay corresponding to time instant when said relay forwards data to said UE.

15. The method, as claimed in claim 11, wherein said generated pilots are based on instructions from said BS.

16. The method, as claimed in claim 11, wherein criteria required for said relay to serve said UE comprises at least one of:
   a radio link between said relay and said UE meeting a threshold quality level;
   a number of UEs attached to said relay not exceeding a threshold value; and
   a link between said BS and said relay not being overloaded.

17. The method, as claimed in claim 11, wherein criteria required for said relay to serve said UE comprises of Base Station UE being present in a Closed Subscriber Group (CSG) of said relay.

* * * * *